(No Model.)
F. H. RICHARDS.
APPARATUS FOR COMMUNICATING POWER TO AND CONTROLLING THE MOTION OF MECHANISM.
No. 269,713. Patented Dec. 26, 1882.
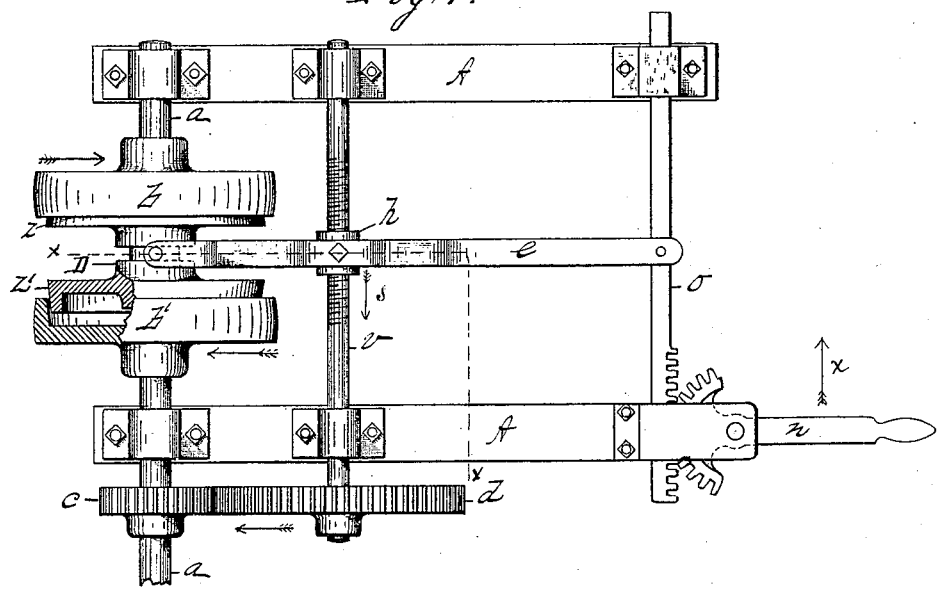
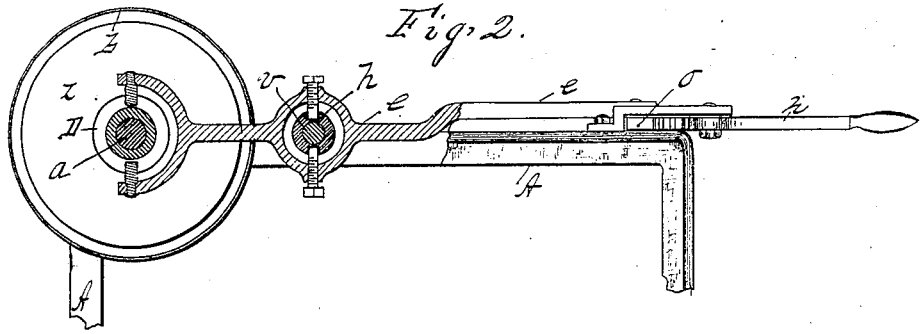
Witnesses
R. F. Hyde
Wm. H. Chapin
Inventor
Francis H. Richards
By Henry A. Chapin
Atty.
N. PETERS, Photo-Lithographer, Washington, D. C.

UNITED STATES PATENT OFFICE.

FRANCIS H. RICHARDS, OF SPRINGFIELD, MASSACHUSETTS.

APPARATUS FOR COMMUNICATING POWER TO AND CONTROLLING THE MOTION OF MECHANISM.

SPECIFICATION forming part of Letters Patent No. 269,713, dated December 26, 1882.

Application filed June 12, 1882. (No model.)

*To all whom it may concern:*

Be it known that I, FRANCIS H. RICHARDS, a citizen of the United States, residing at Springfield, in the county of Hampden and State of Massachusetts, have invented new and useful Improvements in Apparatus for Communicating Power to and Controlling the Motion of Mechanism, of which the following is a specification.

This invention relates to improvements in apparatus for communicating power to and controlling the motion of mechanism, the object being to provide improved means for starting and stopping reversely-rotating pulleys and other analogous devices which are applied to rotating shafts in various mechanical structures; and said invention consists in a novel arrangement of shipper-lever devices, involving the employment of a movable fulcrum for said lever actuated by the said rotating or driven shaft, whereby the shipping mechanism becomes self-operative to arrest the motion of said shaft after a certain number of revolutions of the latter, and the uninterrupted rotation thereof is made dependent upon a movement of the swinging end of said lever corresponding to the movement of said fulcrum, all as hereinafter fully set forth.

In the drawings forming a part of this specification, Figure 1 is a plan view of reversely-rotating mechanism applied to a shaft, to which is applied devices for stopping, starting, and controlling the motion thereof, embodying my invention. Fig. 2 is a section of Fig. 1 on the line *x x* of that figure.

In the drawings, A indicates a suitable frame to support the mechanism herein shown. *a* is a shaft supported in proper boxes on said frame. D is a double-rim friction-clutch adapted to be moved longitudinally on shaft *a*, and to be rotated therewith by means of a key secured thereto and entering a groove in the hub of said clutch in the usual manner. *b b'* are friction-pulleys, fitted to revolve loosely on shaft *a* and to engage alternately with the rims of said clutch. *c* is a gear secured to shaft *a*. *v* is a shaft supported to rotate on frame A parallel to shaft *a*, having a screw-thread cut thereon. *d* is a gear secured to shaft *v*, and engaging with said gear *c*. *h* is a nut fitted to move longitudinally on shaft *v*, on the screw thereon. *e* is a shipper-lever, forked at one end, and provided with pins to engage in the usual way in a groove around the hub of clutch D, and is pivoted by similar means to said nut *h*. *o* is a sliding cross-bar provided with a rack on one edge, and pivotally connected with one end of lever *e*. *n* is a hand-lever hung on frame A, and provided with a segmental gear engaging with said rack on bar *o*.

The friction-pulleys *b b'* are constructed each with a hollow face having a slightly-tapering border surrounding it, and adapted to receive the tapering rims on the above-described clutch D, the latter and said pulleys co operating to cause the shaft *a* to be revolved in the direction corresponding to that in which either of said pulleys may be revolving when said clutch is forced into engagement with it, as hereinafter described. Said pulleys are adapted to be run by two belts—one open and one crossed—to rotate them in opposite directions, as indicated by the arrows near their sides, said clutch having a freedom of motion therebetween sufficient to permit of moving it from its engagement with one pulley to the other, or to bring it equidistant from both pulleys, so that the latter revolve freely on shaft *a* without turning it. The shaft *v*, provided with a screw-thread on that portion thereof opposite said pulleys and clutch, is adapted to be rotated on frame A parallel to shaft *a* by the gears *c* and *d*, secured respectively to the last-named shaft and to shaft *v*, so that the latter shall revolve whenever shaft *a* does.

A nut, *h*, which serves as a fulcrum for lever *e*, as hereinafter described, is fitted to the above-named screwed portion of shaft *v*, and moves thereon back and forth opposite to clutch D when shafts *a* and *v* are rotated, as above described. The shipper-lever *e* is of the usual bifurcated shape at one end when constructed to operate with a clutch having a groove around it, and is provided with the usual pins fixed in its arms to enter said groove at opposite sides of said clutch-hub. Lever *e* is made to encircle the said nut *h* and shaft *v*, as shown in Fig. 2, or otherwise formed to provide for conveniently and practicably pivoting said lever to said nut. As herein shown, two screws or pins pass through that portion of said lever surrounding said nut and enter perforations in opposite sides of the latter, whereby lever e is so attached to said nut that the movement of the latter on shaft v will swing said lever upon its nut-pivots, either end of said lever being held stationary. Said lever e has its swinging end, or that one opposite to its clutch-engaging end, pivotally connected to a sliding cross-bar, o, as shown, and the latter is provided with a rack on one edge, near one end thereof, and a hand-lever, n, having a segment of a gear thereon, is pivoted on frame A, and said gear-segment engages with said rack on bar o.

The above-described lever-and-bar connection with the lever e provides means for operating clutch D to engage the latter with the friction-pulleys b b' with considerable force, and is useful under some circumstances; but, when preferred, lever e may be operated directly by grasping the latter at the end of its long arm, in the usual manner of operating such devices, and the bar o and hand-lever n be dispensed with.

The operation of my improvements is as follows: The pulleys b b' being in motion in the manner and by the means above described, if the hand-lever n be moved in the direction of the arrow x, the friction-rim z of clutch D is engaged with pulley b, causing shaft a to turn toward the right, which motion of shaft a causes the fulcrum-nut h and the forked end of lever e to move in the direction of the arrow s, thereby at once, or as quickly as the proportions and adjustment of the parts allows, disengaging the said ring z from pulley b and stopping the shaft a.

The above-described action of lever e and clutch D is based upon the assumption that while shaft a revolves lever n, and consequently the end of lever e which is pivoted to bar o, rest immovable; but if, when shaft a begins to rotate, lever n is moved in the direction indicated by the arrow x, to swing the long end of lever e at a speed corresponding to that at which the fulcrum-nut h moves in the direction of arrow s, the friction-ring z will remain engaged with pulley b so long as the corresponding movement of said nut h and said end of lever e continues and said rotation of shaft a be maintained. By a reverse motion of lever n clutch D is carried into engagement with pulley b' and the motion of shaft a is reversed. As arranged usually, the starting and stopping of machinery by the use of a shipper-lever are effected by a motion of such lever in one direction to start said machinery, and the latter continues in motion until the starting-lever is moved back to its original position; but by the use of the above-described improvements, while a similar motion to the one above described (of the shipper-lever) is required to start the machine, the latter continues in motion only so long as the entire starting or shipping lever continues to move, as above set forth, and the return of the shipping-lever to its original position so actuates clutch D as to cause shaft a to be reversely rotated to about the same degree as it was while clutch D was in engagement with the pulley b.

The above-described improvements are applicable to all kinds of machinery or parts of the same wherein a limited motion in reverse direction is required, among which are hoisting and dredging machinery, steering apparatus, power-hammers, riveting, punching, and shearing machines, &c., and is particularly useful in operating the feeding mechanism of large machines, combining the easy control of hand-feeding with the force and certainty of power-feeding. In the present instance the immediate driving mechanism shown and described consists of the said friction-clutch and pulleys b b', made operative by the movement of lever e. In practice any driving apparatus may be employed suitable to the nature of the machine employed; also, as herein shown, the fulcrum-nut h is moved by its engagement with the rotating screw on shaft v, the latter being driven from shaft a by the gears c d. It is immaterial to the nature and purpose of this invention that the devices which give said fulcrum-nut the required motion for the purpose above set forth be identically those described, if they be so arranged as to provide a moving shipper-lever fulcrum and appliances whereby by arresting the movement of the long arm of said lever the driving mechanism is, after a certain number of revolutions, rendered inoperative, and by allowing said lever to be carried bodily by said moving fulcrum the uninterrupted operation of said driving mechanism is secured.

What I claim as my invention is—

1. In combination with a reversely-rotating driving mechanism, substantially as described, the shaft a, a movable shipper-lever fulcrum whose movements are controlled, by means substantially as described, by those of said shaft, and a shipper-lever pivoted to said movable fulcrum and engaging with said driving mechanism, substantially as set forth.

2. The combination, with a reversely-rotating driving mechanism, substantially as described, of the shaft a, of a movable shipper-lever fulcrum whose movements are controlled, by means substantially as described, by those of said shaft, of a shipper-lever pivoted to said movable fulcrum and engaging with said driving mechanism, and of means, substantially as described, for moving and arresting the movement of the long arm of said shipper-lever, substantially as set forth.

3. The shaft a, pulleys b b', the friction-clutch D, the screwed shaft v, adapted to be rotated by shaft a, the nut h, and lever e, pivoted to said nut and engaging with said clutch, combined and operating substantially as set forth.

4. The combination, with a shipper-lever engaging with mechanism, substantially as described, for starting and stopping machinery, of a fulcrum pivotally supporting said lever, and capable, by means substantially as described, of movement coincident with the starting of said machinery in the plane of the vibratory movements of said lever, substantially as set forth.

FRANCIS H. RICHARDS.

Witnesses:
H. A. CHAPIN,
R. F. HYDE.